United States Patent
Mustafi et al.

(10) Patent No.: US 10,521,513 B2
(45) Date of Patent: *Dec. 31, 2019

(54) LANGUAGE GENERATION FROM FLOW DIAGRAMS

(71) Applicant: International Business Machines Corporation, Armonk, NY (US)

(72) Inventors: Joy Mustafi, Kolkata (IN); Krishma Singla, Bangalore (IN)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 16/395,074

(22) Filed: Apr. 25, 2019

(65) Prior Publication Data

US 2019/0251179 A1    Aug. 15, 2019

Related U.S. Application Data

(63) Continuation of application No. 15/195,183, filed on Jun. 28, 2016, now Pat. No. 10,318,641, which is a continuation of application No. 14/818,382, filed on Aug. 5, 2015, now abandoned.

(51) Int. Cl.
| | |
|---|---|
| *G06F 17/28* | (2006.01) |
| *G06F 16/33* | (2019.01) |
| *G06F 16/332* | (2019.01) |
| *G06K 9/00* | (2006.01) |

(52) U.S. Cl.
CPC ...... *G06F 17/2881* (2013.01); *G06F 16/3329* (2019.01); *G06K 9/00476* (2013.01)

(58) Field of Classification Search
CPC .............. G06F 17/2881; G06F 17/2845; G06F 17/30864
USPC ............................................................ 704/9
See application file for complete search history.

(56) References Cited

U.S. PATENT DOCUMENTS

| | | | | |
|---|---|---|---|---|
| 4,610,025 | A * | 9/1986 | Blum | G06K 7/143 380/1 |
| 6,658,404 | B1 * | 12/2003 | Cecchini | G06F 16/3329 707/758 |
| 7,305,412 | B2 | 12/2007 | Chau | |
| 9,430,558 | B2 * | 8/2016 | Bhat | G06F 16/338 |
| 10,318,641 | B2 * | 6/2019 | Mustafi | G06F 17/2881 |
| 2007/0215706 | A1 * | 9/2007 | Kotlarsky | G06F 9/44526 235/462.07 |

(Continued)

OTHER PUBLICATIONS

AthTek.com, "Auto Code Generator—AthTek Flowchart to Code", http://www.athtek.com/flowchart-to-code.html#. VV34qmMguMF, Accessed on Mar. 18, 2015, pp. 1-4.

(Continued)

*Primary Examiner* — Vijay B Chawan
*Assistant Examiner* — Rodrigo A Chavez
(74) *Attorney, Agent, or Firm* — Michael A. Petrocelli

(57) ABSTRACT

A computer-implemented method for language generation of a flow diagram, which receives a flow diagram. A plurality of geometric shapes within the flow diagram is identified. A plurality of text elements within the flow diagram is identified. The plurality of text elements and corresponding geometric shapes are associated. The association between the plurality of geometric shapes are identified. A diagram matrix based on the associations between the plurality of geometric shapes is generated. A linear language representation of the diagram matrix is generated.

14 Claims, 5 Drawing Sheets

(56) References Cited

U.S. PATENT DOCUMENTS

| | | | |
|---|---|---|---|
| 2008/0033983 A1* | 2/2008 | Ko | G11B 27/031 |
| 2012/0213429 A1* | 8/2012 | Vasudevan | G06K 9/00476 |
| | | | 382/162 |
| 2014/0237342 A1* | 8/2014 | King | G06F 16/955 |
| | | | 715/224 |
| 2014/0245233 A1 | 8/2014 | Bentov | |
| 2015/0046785 A1* | 2/2015 | Byron | G06F 17/245 |
| | | | 715/227 |
| 2015/0348550 A1* | 12/2015 | Zhang | G06F 3/167 |
| | | | 704/235 |
| 2017/0039192 A1 | 2/2017 | Mustafi | |
| 2017/0039193 A1 | 2/2017 | Mustafi | |

OTHER PUBLICATIONS

Autotracer.org, "Welcome to the free online image vectorizer", Accessed on Mar. 18, 2015, p. 1.

Demir et al., "Generating Textual Summaries of Bar Charts", INLG '08: Proceedings of the Fifth International Natural Language Generation Conference, Jun. 2008, pp. 7-15.

Disclosed Anonymously, "Data Extraction from Chart", IP.com Publication No. 000217623, Publication Date: May 9, 2012, pp. 1-7.

IBM, "IBM Exploratory Computer Vision", http://researcher.watson.ibm.com/researcher/view_group.php?id=1903, Accessed Mar. 18, 2015, pp. 1-2.

List of IBM Patents or Patent Applications Treated as Related. Filed Apr. 25, 2019. 2 pages.

Mishra et al., "VizDraw: A Platform to Convert Online Hand-Drawn Graphics into Computer Graphics", ICIAR '09: Proceedings of the 6th International Conference on Image Analysis and Recognition, Jul. 2009, 10 pages.

Vector Magic, "Easily Convert Bitmap Images to Clean Vector Art", http://vectormagic.com/home, Accessed on Mar. 18, 2015, pp. 1-4.

Wright, "FloMoJo—Convert Text to Flowchart", http://www.joshwright.com/projects/flomojo-convert-text-to-flowchart, Dec. 2011, pp. 1-3.

* cited by examiner

LANGUAGE GENERATION FROM FLOW DIAGRAMS

BACKGROUND

The present invention relates generally to the field of computer systems, and more particularly to language generation of flow diagrams.

Natural language processing (NLP) is a field of computer science, artificial intelligence, and linguistics which is concerned with the interactions between computers and human natural languages. As such, NLP is related to the area of human computer interaction. Image processing is any form of signal processing for which the input is an image, such as a photograph or video frame. The output of image processing may be either an image or a set of characteristics or parameters related to the image. Most image processing techniques involve treating the image as a two-dimensional signal and applying standard signal-processing techniques to it. Optical character recognition (OCR) is the mechanical or electronic conversion of scanned images of hand-written, type-written or printed text into machine-encoded text.OCR is widely used as a form of data entry from some sort of original paper data source, whether documents, sales receipts, mail, or any number of printed records.

SUMMARY

The present disclosure implements a system, method, and computer program product which manages the display of an application form.

In an embodiment, a method for language generation from flow diagrams is provided. The method includes receiving a flow diagram, wherein the flow diagram comprises image with geometric shapes, text attached with the place holders as connected objects. "Place holders" are geometrical objects or shapes with texts (e.g. rectangle, square, circle, including directional arrow and line, where the texts can be inside or outside the shape. The method includes identifying geometric shapes within the flow diagram, the shapes comprise simplest irreducible geometric elements. The method includes identifying text within the flow diagram. The method includes associating the text with corresponding geometric shapes. The method includes identifying associations between the geometric shapes. The method includes generating a diagram matrix based on the associations between the geometric shapes. The method further includes generating a linear language representation of the diagram matrix.

In another embodiment, a computer program product for language generation from flow diagrams is provided. The computer program product includes receiving a flow diagram, wherein the flow diagram comprises image with geometric shapes, text attached with the place holders as connected objects. "Place holders" are geometrical objects or shapes with texts (e.g. rectangle, square, circle, including directional arrow and line, where the texts can be inside or outside the shape. The computer program product includes identifying geometric shapes within the flow diagram, the shapes comprise simplest irreducible geometric elements. The computer program product includes identifying text within the flow diagram. The computer program product includes associating the text with corresponding geometric shapes. The computer program product includes identifying associations between the geometric shapes. The computer program product includes generating a diagram matrix based on the associations between the geometric shapes. The computer program product further includes generating a linear language representation of the diagram matrix.

In another embodiment, a computer system for language generation from flow diagrams is provided. The computer system includes receiving a flow diagram, wherein the flow diagram comprises image with geometric shapes, text attached with the place holders as connected objects. "Place holders" are geometrical objects or shapes with texts (e.g. rectangle, square, circle, including directional arrow and line, where the texts can be inside or outside the shape. The computer system includes identifying geometric shapes within the flow diagram, the shapes comprise simplest irreducible geometric elements. The computer system includes identifying text within the flow diagram. The computer system includes associating the text with corresponding geometric shapes. The computer system includes identifying associations between the geometric shapes. The computer system includes generating a diagram matrix based on the associations between the geometric shapes. The computer system further includes generating a linear language representation of the diagram matrix.

DETAILED DESCRIPTION

Figure 1A:
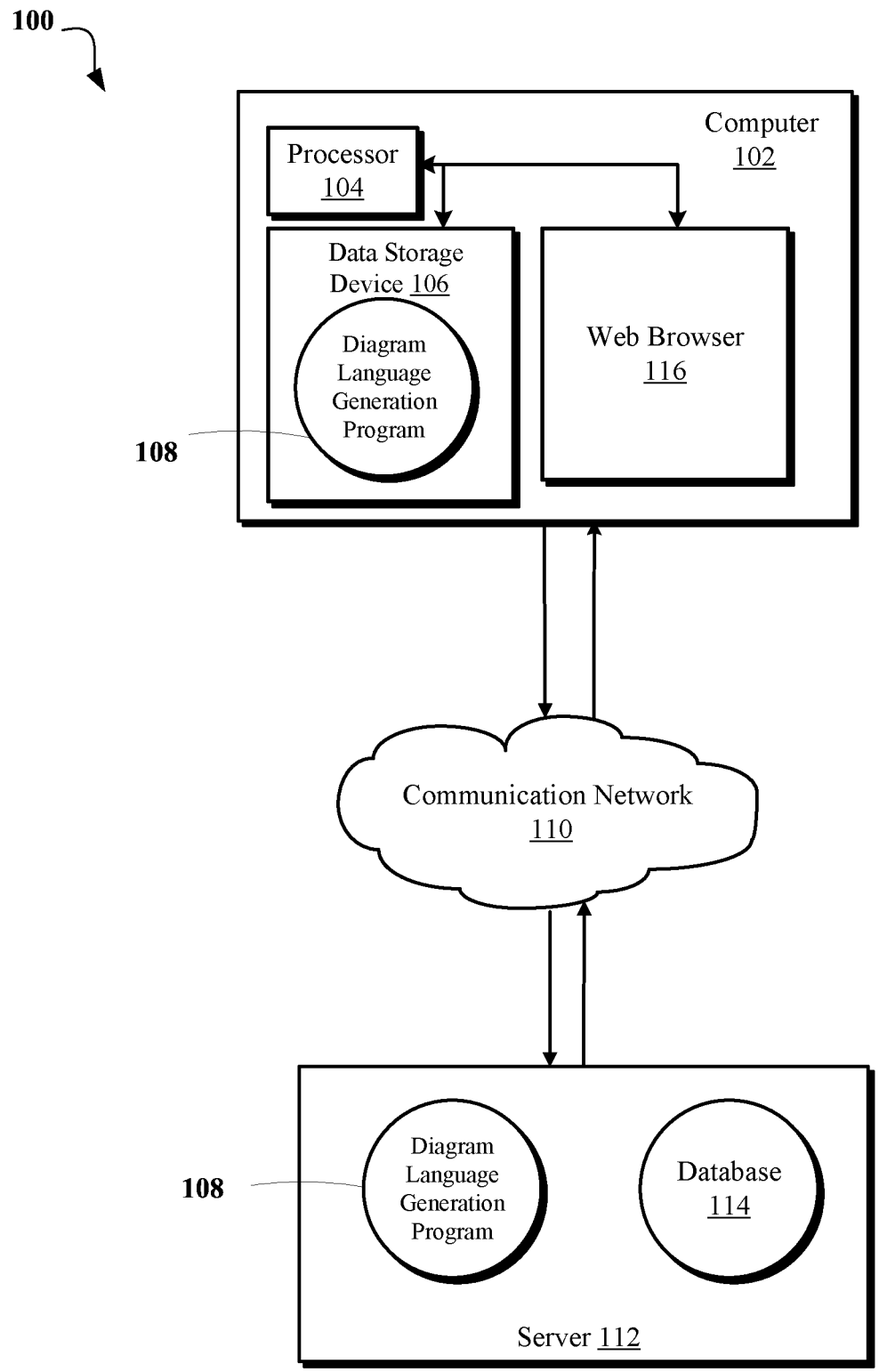
FIG. 1A is schematic block diagram depicting an exemplary computing environment for a diagram language generation program, in accordance with an aspect of the present disclosure.

While the present invention is particularly shown and described with respect to preferred embodiments thereof, it will be understood by those skilled in the art that changes in forms and details may be made without departing from the spirit and scope of the present application. It is therefore intended that the present invention not be limited to the exact forms and details described and illustrated herein, but falls within the scope of the appended claims.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

FIG. 1A is a schematic block diagram depicting a computing environment 100 for language generation of flow diagrams. In various embodiments of the present invention, computing environment 100 includes a computer 102 and server 112, connected over communication network 110.

Computer 102 may include a processor 104 and a data storage device 106 that is enabled to run a diagram language generation program 108 and a web browser 116, in order to display the result of a program on server 112, such as, diagram language generation Program 108 communicated by communication network 110. Non-limiting examples of a web browser may include: Firefox®, Explorer®, or any other web browser. All brand names and/or trademarks used herein are the property of their respective owners.

Computing environment 100 may also include a server 112 with a database 114. The server 112 may be enabled to run a diagram language generation Program 108. Communication network 110 may represent a worldwide collection of networks and gateways, such as the Internet, that use various protocols to communicate with one another, such as Lightweight Directory Access Protocol (LDAP), Transport Control Protocol/Internet Protocol (TCP/IP), Hypertext Transport Protocol (HTTP), Wireless Application Protocol (WAP), etc. communication network 110 may also include a number of different types of networks, such as, for example, an intranet, a local area network (LAN), or a wide area network (WAN).

It should be appreciated that FIG. 1A provides only an illustration of one implementation and does not imply any limitations with regard to the environments in which different embodiments may be implemented. Many modifications to the depicted environments may be made based on design and implementation requirements.

The computer 102 may communicate with server 112 via the communication network 110. The communication network 110 may include connections, such as wire, wireless communication links, or fiber optic cables.

Computer 102 and server 112 may be, for example, a mobile device, a telephone, a personal digital assistant, a netbook, a laptop computer, a tablet computer, a desktop computer, or any type of computing device capable of running a program and accessing a network. A program, such as a diagram language generation program 108 may run on the computer 102 or on the server 112. It should be appreciated that managing program 108 has the same component and operation methods regardless of whether it is run on the server 112 or computer 102. Therefore diagram language generation program 108 applies to a program implemented within the environment of the computer 102 and/or implemented within the environment of the server 112 interchangeably.

Figure 1B:
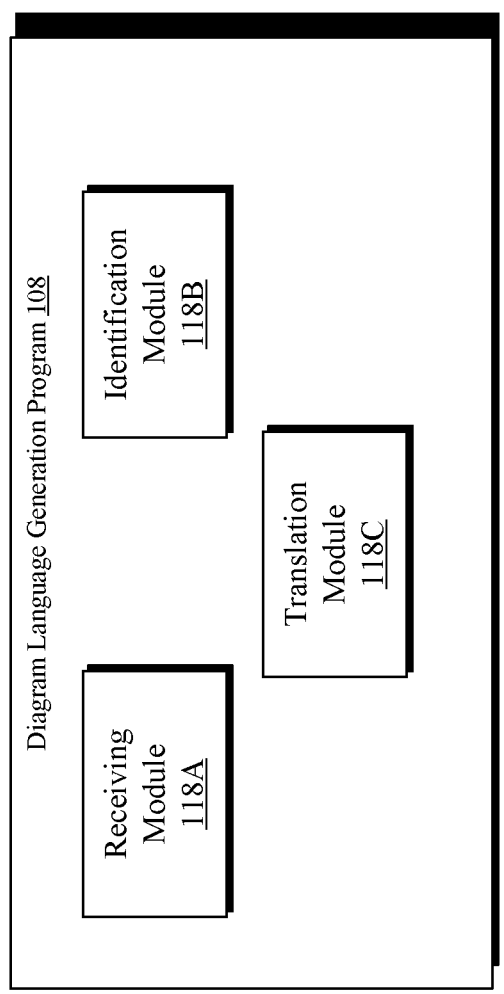
FIG. 1B is as schematic block diagram depicting components of a diagram language generation program, in accordance with an aspect of the present disclosure.

Referring now to FIG. 1B, a diagram language generation program 108 may include a receiving module 118A, identification module 118B, and translation module. Receiving module 118A may receive a flow diagram from a user. Identification module 118B may identify the shapes, connectors, and the text within the flow diagram. Translation module 118C may translate the text and shapes into linear language representation. An embodiment of the present disclosure provides that a user takes a picture of a flow diagram such as flow diagram 302 (FIG. 3) on his mobile phone. Receiving module 118A, in this embodiment, receives, the picture. Identification module 118B, using Optical Character Recognition (hereafter known as "OCR"), identifies different shapes and connectors within the flow diagram 302 as flow diagram 304. Identification module 118B, in the embodiment, also using OCR, identifies the text within flow diagram 302 and associates the recognized text with the recognized shapes (of flow diagram 304) in order to create a flow diagram such as flow diagram 306. Translation module may identify the connectors and shapes within the flow diagram 306 and create a diagram matrix such as diagram matrix 308. A diagram matrix is an array of aggregated statistical information regarding diagram boxes within the flow diagram and how they are connected to each other. Diagram matrix 308 includes information regarding how different shapes within the flow diagram 306 are connected. Using the diagram matrix 308, translation module 118C may translate the information and shapes into the following linear language representation: "Start" to "Turn on taps" to "See how much water is in the bath" to see "Is bath full enough?" if "Yes" then "Turn off taps" else if "No" then "See how much water is in the bath" to "Stop".

Figure 2:
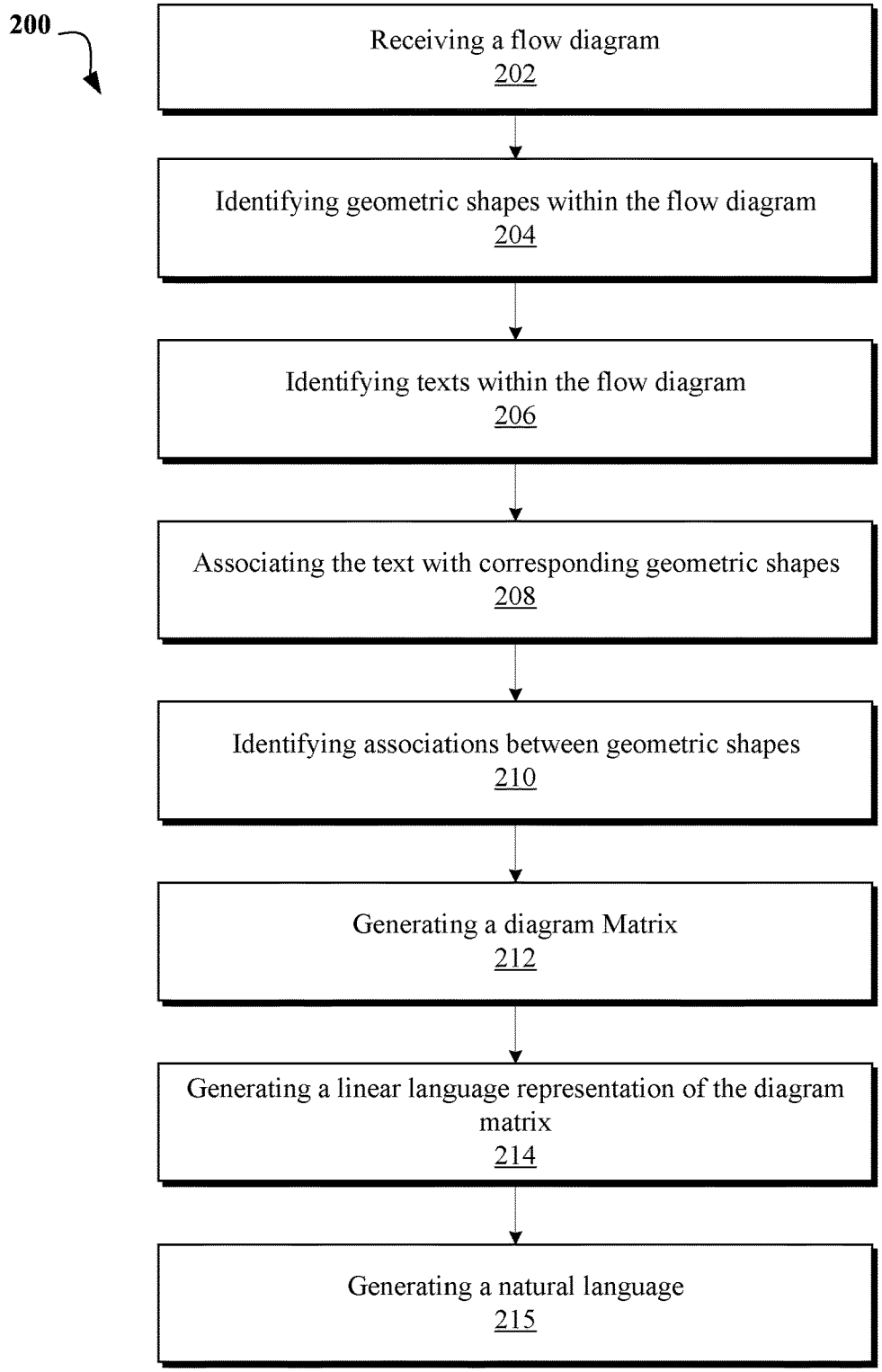
FIG. 2 is a flowchart depicting operational steps of a method for a diagram language generation program, in accordance with an embodiment of the present disclosure.

In reference to FIG. 2 and FIG. 3, FIG. 2. is a flowchart that depicts the operational steps of a method 200 for a diagram language generation program, in accordance with an embodiment of the present disclosure. Steps of method 200 may be implemented using one or more modules of a computer program such as diagram language generation program 108, and executed by a processor of a computer, such as computer 102. It should be appreciated that FIG. 2 does not imply any limitations with regard to the environments or embodiments which may be implemented. Many modifications to the depicted environment or embodiment shown in FIG. 2 may be made. FIG. 3 depicts an embodiment of the present disclosure. In this embodiment, a hand-drawn flow diagram such as flow diagram 302 is received by the receiving module 118A. Identification module 118B identifies the shapes as represented in flow diagram 304 and the text is recognized as represented in flow diagram 306.

At 202, operation of the receiving module 118A is depicted. Receiving module 118A may receive a flow diagram. A flow diagram may represent an algorithm, workflow or process, showing the steps as boxes of various kinds, and their order by connecting them with arrows. In one embodiment, this diagrammatic representation may illustrate a solution model to a given problem. Flow diagrams may be used in analyzing, designing, documenting or managing a process or program in various fields. A flow diagram may comprise one or more geometric shapes/diagrams, words, numbers, and/or metadata associated with the words. Receiving module 118A may receive the geometric shapes, word(s) and/or metadata associated with the words from a user or a computer implemented system. Non-limiting examples of an input source may be pictures, scanned images, spoken words, typed text, or inputting a corpus electronically from a computer implemented source such as an electronic device (e.g. cell phones, tablets, or other electronic devices with speech recognition ability).

The flow diagram may be in various formats. Non-limiting examples of a format of a flow diagram comprise hand-drawn, bitmap (scanned, softcopy, or other files such as files with bmp, jpg, png, or tif extensions), or vector graphics (e.g. files with ppt extension). It must be appreciated that a hand-drawn flow diagram may be converted to a bitmap. In one embodiment, the hand-drawn flow diagram may be scanned or photographed and converted into bitmap images. This may be referred to as digitization.

Vector graphics is the use of geometrical primitives such as points, lines, curves, and shapes or polygons—all of which are based on mathematical expressions—to represent images in computer graphics. In one embodiment, user has created a flow diagram in a software with ppt extension (i.e. Microsoft Power Point™). In that embodiment, the flow diagram has already been reduced to shapes recognizable by a computer program. In this embodiment, receiving module 118A may receive a file which includes the flow diagram. It must also be appreciated that in an embodiment the words and shapes of the diagram may not be received from the same source. For example, in an embodiment, a user may fill in the text in a pre-drawn flow diagram by spoken words.

In the present embodiment, a user draws flow diagram 302 by hand and takes a picture of flow diagram 304 on a mobile device. Receiving module 118A receives the picture of flow diagram 304.

At 204-210 depict operation of the identification module 118B. At 204, identification module 118B may identify various geometric shapes within the received flow diagram. Identification module 118B, in one embodiment, may analyze the flow diagram using various image processing techniques, such as: edge detection, boundary of shapes and types of shapes, connection identification, text labels extraction (using standard OCR system), continuity of diagram and jump-links retrieval, legend (color overlay) classification, or convert into vector graphics. Identification module 118B may reduce all the geometric shapes to geometric primitives. A geometric primitive is a simplest irreducible geometric element. For example, identification module 118B may reduce a triangle (which is a geometric shape) into three connecting lines (which are the simplest irreducible geometric elements).

It must also be appreciated that if the received flow diagram is in vector graphics, in that embodiment, the shapes are already in recognizable format for the identification module. Identification module 118B may separate the flow diagram into imagelets. An imagelet is a part of an image or geometric shapes (such as rectangles, circles etc.) and text attached with the placeholders along with the connectors (e.g. arrows). Identification module 118B may use the imagelets in order to determine various parts and their corresponding meaning of the flow diagram (e.g. boxes, arrows, connectors).

Identification module 118B may also identify the text within the flow diagram. Identification module 118B may use Natural Language Processing methods and OCR methods in order to identify the text within the flow diagram. Identification module 118B may also combined the identified imagelets and text in order to create an identified or mapped flow diagram.

In the present embodiment, identification module 118B identifies different shapes and boxes within the received flow diagram (i.e. flow diagram 302). Identification module 118B uses edge and boundary detection to identify all the boxes within flow diagram 302. Identification module 118B identifies S0-S5 (as labeled on flow diagram 304).

At 206, identification module 118B may identify the text within the flow diagram. In one embodiment, identification module 118B may use OCR or NLP to identify the text. In another embodiment, if the flow diagram is in a digital form (i.e. vector grams, ppt extensions etc.) identification module 118B may receive the electronic text stream. In the present embodiment, identification module uses OCR and NLP to identify the text within the flow diagram 302.

At 208, identification module 118B may associate the identified text (from step 206), with corresponding geometric shapes (identified at step 204). Identification module 118B may, in one embodiment, associate the text with the geometric diagram based on the position of the text. In that embodiment, if the text is identified to be within the geometric shape, identification module 118B may further associate the identified text to said geometric shape.

In the present embodiment, identification module 118B uses the position of the identified texts to associate them to the identified shapes. In the present embodiment, identification module 118B associates "start" to S0, "turn on taps" to S1, "see how much water is in the bath" to S2, "is the bath full" to S3, "turn off taps" to S4, and "stop" to S5. In the present embodiment, identification module may represent this association by combining the identified text and shapes into a flow diagram such as flow diagram 306.

At 210, identification module 118 may identify the associations between the geometric shapes within the flow diagram. Identification module, in an embodiment, may also analyze the imagelets for certain predefined geometric shapes. Identification module 118B may, using a predefined criteria and values, determine meanings for different boxes within the flow diagram. For example, identification module 118B may identify a parallelogram an Input/output box. Identification module 118B may identify a hexagon as a preparation step (i.e. a box with operations which have no effect other than preparing a value for a subsequent conditional or decision step.). Identification module 118B may identify a diamond box (i.e. rhombus shape) as a Yes/No or decision box. In another embodiment, identification module may also identify a decision box by determining that there are two arrows coming out a box. Identification module 118B may identify a loop as two arrows pointing at each other or as connector which connects a decision step to a box contrary to the sequential steps.

Identification module 118B may also analyze, identify the imagelets of the connectors and place holders and determine their corresponding meanings. Place holders" are geometrical objects or shapes with texts (e.g. rectangle, square, circle, including directional arrow and line, where the texts can be inside or outside the shape. For example, in an embodiment, identification module 118B may analyze the direction of the connectors (e.g. arrows) and determine the sequence and order of the diagram flows. For example, identification module 118B may interpret an arrow to show "flow of control". Identification module 118B may identify the beginning and the end of an arrow by determining where the arrowhead is located. Identification module may determine that an arrow coming from one box and ending at another box may represent that control passes to the box that the arrow points to. The line for the arrow can be solid or dashed. The meaning of the arrow with dashed line may differ from one flowchart to another and can be defined in the legend.

In the present embodiment, identification module 118B identifies e0-e5 as connectors. Identification module 118B also identifies the properties of these connectors. For example identification module 118B identifies that e1 starts from S0 and ends on S1 (because identification module 118B identifies that the arrowhead in on the direction of S1). Identification module 118B, in the present embodiment, also identifies types of the shapes. For examples identification module 118B identifies S0 and S5 as a rectangular diagram box with no edges, S1, S2, and S4 as a rectangular box, and S3 as a parallelogram. In this embodiment, identification module 118B, identifies the types of the diagram boxes from their geometric types. For example, in the present embodiment, identification module 118B identifies S0 and S5 as start or stop diagram boxes because they are rectangular with no edges; S1, S2, and S4 are regular action steps because they are rectangular boxes with edges; and S3 as a decision step due to the shape of the box being a parallelogram.

Steps 212 and 214 depict the operation of the translation module 118C. At 212, translation module 118C may generate a diagram matrix. Translation module 118C may, in one embodiment, represent the boxes and connectors in diagram matrix such as diagram matrix 308. In one example, connectors may be referred as edges and may be represented as a separate list. A diagram matrix is a matrix having rectangular array of numbers or other symbols, for which representation such as connectors are defined. The horizontal and vertical lines of entries in a matrix are called rows and columns, respectively such as row 310 and column 312. In one embodiment, the diagram matrix comprises of rows and columns representing search shape identified within the flow diagram (See FIG. 306). The numbers, symbols or expressions in the matrix are called its elements (such as e4 element referenced as 314). Each element's information correspond to its respective column and row and may comprise Source, shape, location of the arrowhead, destination shape, Text (text related to arrow if any), and type (such as unidirectional or multidirectional). For example, element 314 corresponds to column represented by S2 and row represented by S3, therefore element 314 pertains to information about the association between respective column S2 and row S3. In other words, e4 gives information on direction from S3 to S2. Similarly, element e3 (referenced as 316) corresponds to connectivity information between column represented by S4 and row represented by S3. In other words, e3 is showing a direction from S3 to S4. In this example embodiment, that e4 and e3 describe directions between S3 to S2 and S3 to S4, respectively. Thus, establishing multi-directional relation between the imagelets. In one implementation, list of connectors may be separately provided (not shown).

At 214, translation module 118C may use the diagram matrix to translate the flow diagram into linear language representation. Linear language is a language generated by some linear grammar. Linear grammar refers to a context-free grammar that has at most one nonterminal in the right hand side of its productions. A non-limiting example of linear language is V→w where V is a nonterminal symbol, and w is a string of terminals and/or non-terminals (w can be empty). A language is considered linear when its production rules can be applied regardless of the context of a nonterminal (i.e. no matter which symbols surround it, the single nonterminal on the left hand side can always be replaced by the right hand side.

In one embodiment, translation module 118C may use a format such as the format below to translate the diagram matrix into linear text:
<source_shape>.<text> (Shape text)
<edge value> (Connector text)
<destination_shape>.<text> (Shape text)

Translation module 118C may enhance the linear language representation of the flow diagram using the domain knowledge and the contextual information captured. For example, in one embodiment, translation module may identify a box as a conditional box when the word "if" is used in the text (even though there is only one connector coming out of the box). For example, in an embodiment, "to" is used as default when the connector has no text associated. Translation module 118C may also, depending upon the context of the document, domain or image captions, or the box, change the connector word. For example, if identification module 118B identifies a box as "rhombus", translation module 118C may use the word "if else" when translating the diagram matrix to linear language representation. In another embodiment, translation module 118C may repeat each connector if there are multiple connectors between a pair of boxes.

At 215, translation module 118C may also translate this linear language representation into natural language representation and/or index the words. Indexing a word refers to search engine indexing in which a word is collected, parsed, and stored in order to facilitate fast and accurate information retrieval by a search engine. An alternate name for the process in the context of search engines designed to find web pages on the Internet is web indexing. In the present embodiment, the linear language representation may be translated to natural language representation (i.e. colloquial language which is understandable to the general public) and indexed. In that non-limiting embodiment, the indexing may be communicated to a data base for online searching purposes.

Figure 3A:
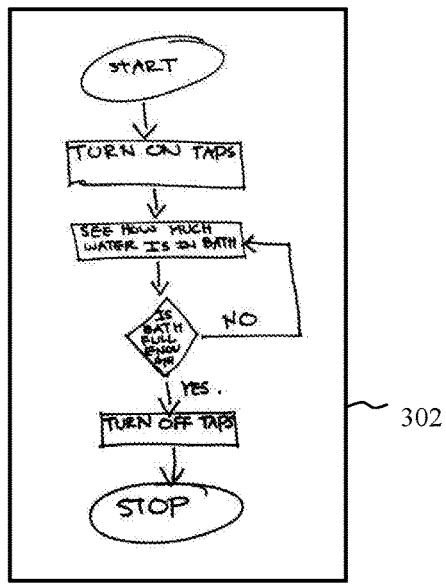
FIGS. 3A-D are schematic block diagrams depicting a generation of language from a hand-drawn flow diagram, according to an embodiment of the present disclosure.
Figure 3B:
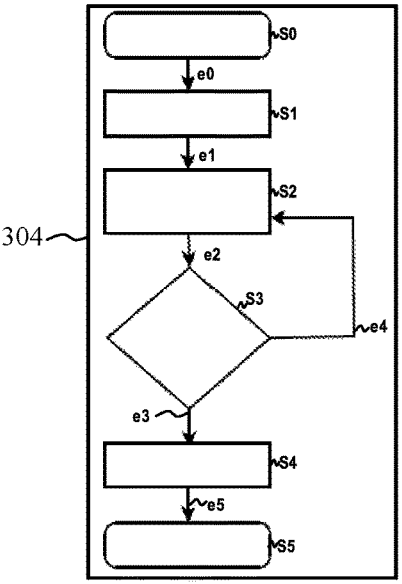
Figure 3C:
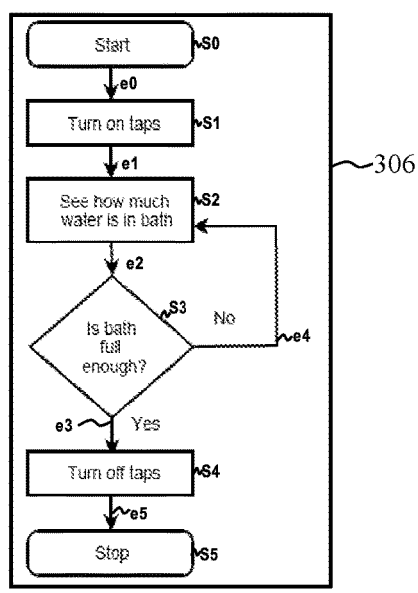
Figure 3D:
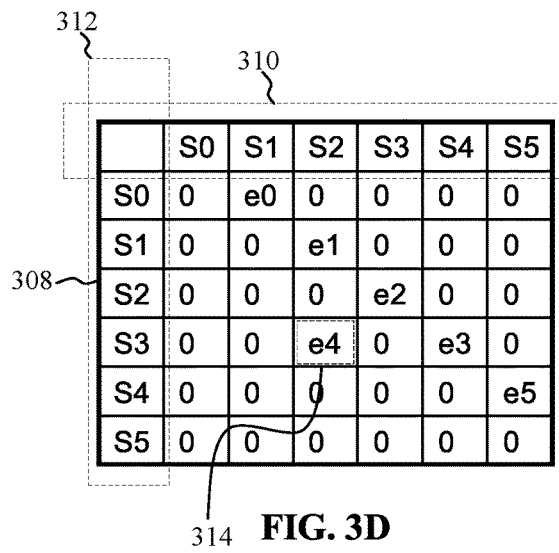

In the present embodiment, translation module 118C creates diagram matrix 308 and places all the shapes within row 310 and column 312 consecutively as shown on FIG. 3D. In the present embodiment, translation module uses the following format to translate the information within the diagram matrix to linear language representation:
<source_shape>.<text> (Shape text)
<edge value> (Connector text)
<destination_shape>.<text> (Shape text)

In the present embodiment, for example, translation module 118C translates the first two diagram boxes into the following:
<S0>.<Start>
<e0>
<S1>.<Turn on the tap>

Translation module 118C, in this embodiment, also replaces the above-mentioned format with values and texts from flow diagram 302 identified by the identification module 118B. The following is the result:
<Rectangle with no edge>.<Start">
<to>
<Rectangle with edge>.<Turn on taps>

It must be noticed that translation module replaces "edge value" with "e0" and to "to" as default because the connector (e0) has no text associated and the shape of S0 and S1 are not decision steps.

In the present embodiment, translation module 118C also translates the linear language representation into natural language representation. The following is the result of that:
"Start" to "Turn on taps" to "See how much water is in the bath" to "Is bath full enough?" if "Yes" then "Turn off taps" else if "No" then "See how much water is in the bath" to "Stop".

Figure 4:
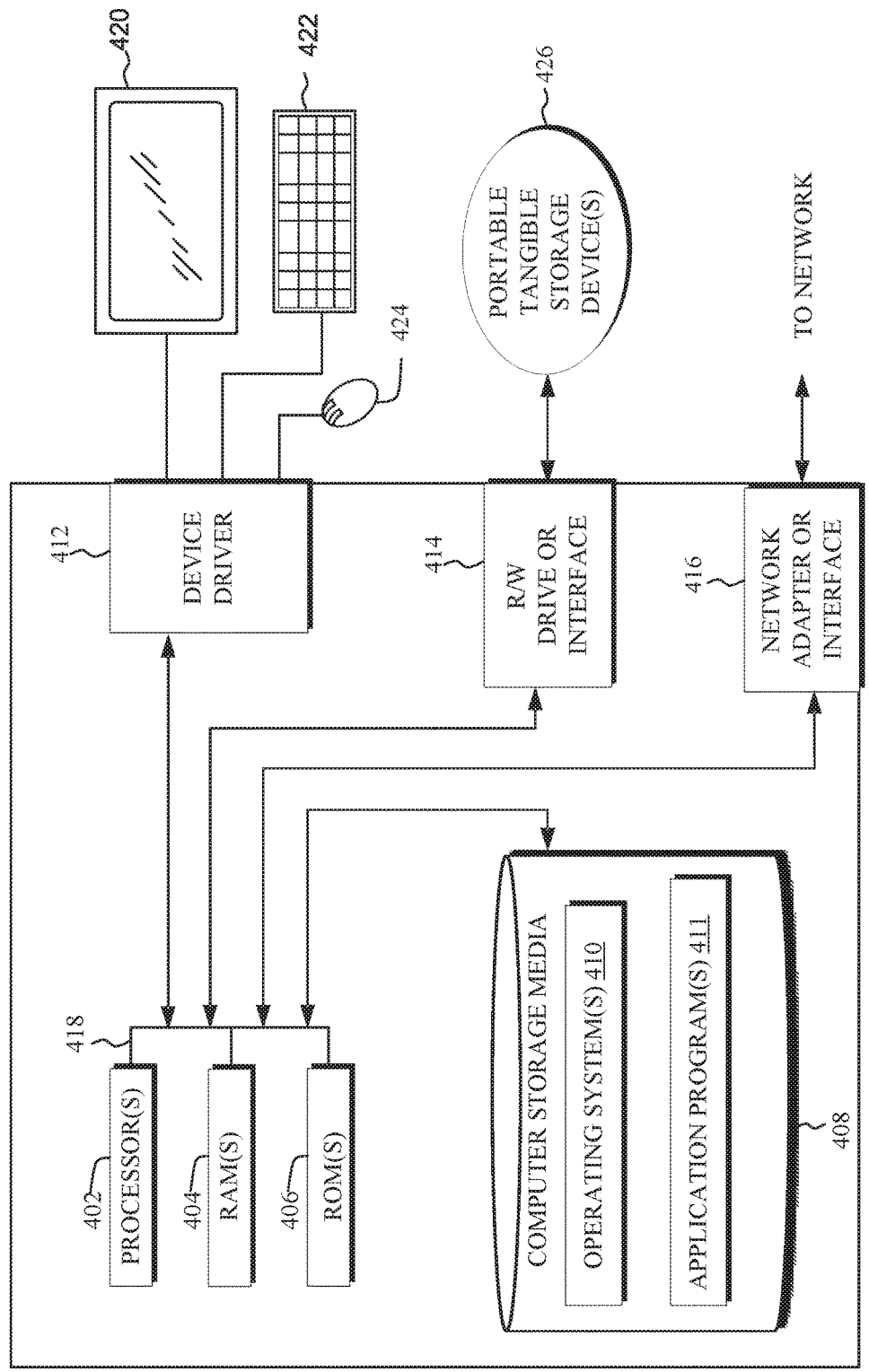
FIG. 4 is a block diagram of internal and external components of computers and servers depicted in FIG. 1, according an embodiment of the present disclosure.

Referring now to FIG. 4 of components a computer system, for example server 112 of computing environment 100 of FIG. 1, in accordance with an embodiment of the present disclosure.

Server 112 may include one or more processors 402, one or more computer-readable RAMs 404, one or more computer-readable ROMs 406, one or more computer readable storage media 408, device drivers 412, read/write drive or interface 414, network adapter or interface 416, all interconnected over a communications fabric 418. Communications fabric 418 may be implemented with any architecture designed for passing data and/or control information between processors (such as microprocessors, communications and network processors, etc.), system memory, peripheral devices, and any other hardware components within a system.

One or more operating systems 410, and one or more application programs 411, are stored on one or more of the computer readable storage media 408 for execution by one or more of the processors 402 via one or more of the respective RAMs 404 (which typically include cache memory). In the illustrated embodiment, each of the computer readable storage media 408 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Server 112 and computer 102 may also include an R/W drive or interface 414 to read from and write to one or more portable computer readable storage media 426. Application programs 411 on server 112 and computer 102 may be stored on one or more of the portable computer readable storage media 426, read via the respective R/W drive or interface 414 and loaded into the respective computer readable storage media 408.

Server 112 may also include a network adapter or interface 416, such as a TCP/IP adapter card or wireless communication adapter (such as a 4G wireless communication adapter using OFDMA technology). Application programs 411 on server 112 and may be downloaded to the computing device from an external computer or external storage device via a network (for example, the Internet, a local area network or other wide area network or wireless network) and network adapter or interface 416. From the network adapter or interface 416, the programs may be loaded onto computer readable storage media 408. The network may comprise copper wires, optical fibers, wireless transmission, routers, firewalls, switches, gateway computers and/or edge servers.

Server 112 and computer 102 may also include a display screen 420, a keyboard or keypad 422, and a computer mouse or touchpad 424. Device drivers 412 interface to display screen 420 for imaging, to keyboard or keypad 422, to computer mouse or touchpad 424, and/or to display screen 420 for pressure sensing of alphanumeric character entry and user selections. The device drivers 412, R/W drive or interface 414 and network adapter or interface 416 may comprise hardware and software (stored on computer readable storage media 408 and/or ROM 406).

The invention claimed is:

1. A computer system for language generation from flow diagrams, the computer system comprising:
    one or more processors, one or more computer-readable memories, one or more computer-readable tangible storage devices, and program instructions stored on at least one of the one or more storage devices for execution by at least one of the one or more processors via at least one of the one or more memories, wherein the computer system is capable of performing a method comprising:
    receiving, by a computer, a picture of a flow diagram, wherein the picture of the flow diagram comprises a hand-drawn image of the flow diagram;
    identifying, by the computer, a plurality of geometric shapes within the picture of the flow diagram using image processing techniques including edge detection, boundary of shapes and types of shapes, connection identification, text labels extraction with an optical character recognition system, continuity of diagram and jump-links retrieval, legend (color overlay) classification, or convert into vector graphics;
    converting the identified plurality of geometric shapes into geometric primitives, each geometric primitive comprises an irreducible geometric element;
    identifying, by the computer, a plurality of text elements within the picture of the flow diagram using optical character recognition and natural language processing;
    based on the geometric primitives, identifying, by the computer, a plurality of connectors connecting the identified plurality of geometric shapes in the picture of the flow diagram by separating the identified plurality of geometric shapes and the plurality of connectors into imagelets, each imagelet comprising at least one geometric shape from the plurality of geometric shapes, at least one text element from the plurality of text elements attached to a placeholder along with the plurality of connectors;
    identifying associations between the plurality of geometric shapes, the plurality of text elements and the plurality of connectors by combining the imagelets and the plurality of text in order to create a map of the flow diagram;
    based on the identified associations, automatically generating a machine-encoded version of the hand-drawn image of the flow diagram together with a linear language representation and a natural language representation of the flow diagram to provide fast and accurate information retrieval by search engines;
    based on imagelets associated with a plurality of predefined geometric shapes, the identified associations and a predefined criteria, determining corresponding meanings between the plurality of geometric shapes, the identified plurality of connectors, and placeholders within the flow diagram;
    generating a diagram matrix based on the identified associations and corresponding meanings between the plurality of geometric shapes, the plurality of text elements and the plurality of connectors, wherein each element of the diagram matrix corresponds to at least one of the identified associations, the identified associations comprising relationships between a source shape, a shape type, a location of an arrowhead, a destination shape, a text element, a position of a text element within a shape type, a multi-directional relation between imagelets, a direction and a connector type;
    generating the linear language representation of the flow diagram based on the diagram matrix;
    in response to at least one geometric shape in the plurality of geometric shapes missing at least one text element, modifying the flow diagram and the linear language representation to include a default text element associated with the at least one geometric shape, wherein the default text element is selected from a predefined set of default text elements associated with the plurality of geometric shapes based on a domain knowledge and a contextual information;
    translating the linear language representation into the natural language representation of the flowchart;
    indexing the natural language representation of the flow diagram;
    communicating the indexed natural language representation to a database; and
    retrieving, from the database by a search engine, the indexed natural language representation of the flowchart.

2. The computer system of claim 1, wherein the picture comprises an image comprising one or more of a geometric shape, text, a place holder, and a connector.

3. The computer system of claim 1, further comprising:
    indexing the linear language representation;
    communicating the indexed natural language representation to the database; and
    retrieving, from the database by the search engine, the indexed linear language representation of the flowchart.

4. The computer system of claim 1, wherein the picture is received from a computer implemented source comprising cellphones, tablets and other electronic devices.

5. The computer system of claim 1, wherein the diagram matrix comprises an array of aggregated statistical information regarding the plurality of geometric shapes within the flow diagram and their connection.

6. The computer system of claim 1, further comprising:
    in response to at least one connector in the plurality of connectors missing at least one text element from the plurality of text elements, modifying the flow diagram and the linear language representation to include a default text element associated with the at least one connector, wherein the default text element is selected from a predefined set of default text elements.

7. The computer system of claim 1 further comprising:
receiving text and geometric shapes associated with the flow diagram from different input sources.

8. The computer system of claim 7, wherein receiving text and geometric shapes associated with the flow diagram from different input sources allows filling a pre-drawn flow diagram by using spoken words.

9. A computer system for language generation from flow diagrams, the computer system comprising:
one or more processors, one or more computer-readable memories, one or more computer-readable tangible storage devices, and program instructions stored on at least one of the one or more storage devices for execution by at least one of the one or more processors via at least one of the one or more memories, wherein the computer system is capable of performing a method comprising:
receiving, by a device with speech recognition capabilities, a spoken description of a flow diagram;
identifying, by the device, a plurality of geometric shapes within the spoken description of the flow diagram using natural language processing techniques;
converting the identified geometric shapes into geometric primitives, each geometric primitive comprises an irreducible geometric element;
identifying, by the device, a plurality of text elements within the spoken description of the flow diagram;
based on the geometric primitives, identifying, by the device, a plurality of connectors connecting the plurality of geometric shapes in the spoken description of the flow diagram by separating the identified plurality of geometric shapes and the plurality of connectors into imagelets, each imagelet comprising at least one geometric shape from the plurality of geometric shapes, at least one text element from the plurality of text elements attached to a placeholder along with the plurality of connectors;
identifying associations between the plurality of geometric shapes, the plurality of text elements and the plurality of connectors by combining the imagelets and the plurality of text in order to create a map of the flow diagram;
based on the identified associations, automatically generating a machine-encoded version of the spoken description of the flow diagram together with a linear language representation and a natural language representation of the flow diagram to provide fast and accurate information retrieval by search engines;
based on imagelets associated with a plurality of predefined geometric shapes, the identified associations and a predefined criteria, determining corresponding meanings between the plurality of geometric shapes, the identified plurality of connectors, and placeholders within the flow diagram;
generating a diagram matrix based on the identified associations and corresponding meanings between the plurality of geometric shapes, the plurality of text elements and the plurality of connectors, wherein each element of the diagram matrix corresponds to at least one of the identified associations, the identified associations comprising relationships between a source shape, a shape type, a location of an arrowhead, a destination shape, a text element, a position of a text element within a shape type, a multi-directional relation between imagelets, a direction and a connector type;
generating a linear language representation of the of the flow diagram based on the diagram matrix;
in response to at least one geometric shape in the plurality of geometric shapes missing at least one text element from the plurality of text elements, modifying the flow diagram and the linear language representation to include a default text element associated with the at least one geometric shape, wherein the default text element is selected from a predefined set of default text elements associated with the plurality of geometric shapes based on a domain knowledge and a contextual information;
translating the linear language representation into a natural language representation;
indexing the natural language representation of the automated representation of the digitized description of the flow diagram;
communicating the indexed natural language representation to a database; and
retrieving, from the database by a search engine, the indexed natural language representation of the flowchart.

10. The computer system of claim 9 further comprising:
receiving text and geometric shapes associated with the flow diagram from different input sources.

11. The computer system of claim 10, wherein receiving text and geometric shapes associated with the flow diagram from different input sources allows filling a pre-drawn flow diagram by using spoken words.

12. A computer system for language generation from flow diagrams, the computer system comprising:
one or more processors, one or more computer-readable memories, one or more computer-readable tangible storage devices, and program instructions stored on at least one of the one or more storage devices for execution by at least one of the one or more processors via at least one of the one or more memories, wherein the computer system is capable of performing a method comprising:
receiving, by a computer, a description of a flow diagram, wherein the description of the flow diagram comprises a digitized hand-drawn representation of the flow diagram, a spoken explanation of the flow diagram, or a typed text from a computer implemented source describing the flow diagram;
identifying, by the computer, a plurality of geometric shapes within the description of the flow diagram using image processing techniques including convert into vector graphics;
identifying, by the computer, a plurality of text elements within the description of the flow diagram using optical character recognition and natural language processing;
identifying, by the computer, a plurality of connectors connecting the plurality of geometric shapes in the description of the flow diagram by separating the identified plurality of geometric shapes and the plurality of connectors into imagelets, each imagelet comprising at least one geometric shape from the plurality of geometric shapes, at least one text element from the plurality of text elements attached to a placeholder along with the plurality of connectors;
identifying associations between the plurality of geometric shapes, the plurality of text elements and the plurality of connectors by combining the imagelets and the plurality of text in order to create a map of the flow diagram, the associations comprising relationships between each of the plurality of geometric shapes, the plurality of text elements and the plurality of connectors;

based on the identified associations, automatically creating a machine-encoded version of the description of the flow diagram together with a linear language representation and a natural language representation of the flow diagram to provide fast and accurate information retrieval by search engines;

based on imagelets associated with a plurality of predefined geometric shapes, the identified associations and a predefined criteria, determining corresponding meanings between the plurality of geometric shapes, the identified plurality of connectors, and placeholders within the description of the flow diagram;

generating a diagram matrix based on the identified associations and corresponding meanings between the plurality of geometric shapes, the plurality of text elements and the plurality of connectors;

generating a linear language representation of the description of the flow diagram based on the diagram matrix, wherein the linear language representation is generated using linear grammar;

in response to at least one geometric shape in the plurality of geometric shapes missing at least one text element from the plurality of text elements, modifying the description of the flow diagram and the linear language representation to include a default text element associated with the at least one geometric shape, wherein the default text element is selected from a predefined set of default text elements associated with the plurality of geometric shapes based on a domain knowledge and a contextual information;

indexing the linear language representation of the flow diagram; and retrieving, from the database by a search engine, the indexed natural language representation of the flowchart.

13. The computer system of claim 12 further comprising:
receiving text and geometric shapes associated with the flow diagram from different input sources.

14. The computer system of claim 13, wherein receiving text and geometric shapes associated with the flow diagram from different input sources allows filling a pre-drawn flow diagram by using spoken words.

* * * * *